United States Patent [19]
Park

[11] Patent Number: 5,872,757
[45] Date of Patent: Feb. 16, 1999

[54] LOADING SYSTEM FOR 80MM AND 120MM CD'S IN A VEHICLE PLAYER DECK HAVING AUXILIARY LOCKING FOR GUIDING THE 80MM DISC

[75] Inventor: Hyun Chan Park, Suwon, Rep. of Korea

[73] Assignee: Samsung Electro-Mechanics Co., Ltd., Suwon, Rep. of Korea

[21] Appl. No.: 909,667

[22] Filed: Aug. 12, 1997

[30] Foreign Application Priority Data

Aug. 26, 1996 [KR] Rep. of Korea .................. 1996 35504

[51] Int. Cl.⁶ ...................................................... G11B 17/04

[52] U.S. Cl. ............................................................ 369/77.1

[58] Field of Search .................................. 369/75.2, 77.1, 369/77.2, 270

[56] References Cited

U.S. PATENT DOCUMENTS 5,010,484   4/1991   Kobayashi et al. .................... 369/77.1
5,173,893  12/1992   Moorikawa et al. .................. 369/77.1

*Primary Examiner*—George J. Letscher
*Attorney, Agent, or Firm*—Ladas & Parry

[57] ABSTRACT

A loading system for 80 mm and 120 mm CDs in a player of a deck of a vehicle. This loading system has a pair of pivotal stoppers which are interengaged by teeth and which guide the compact discs onto a turntable. The stoppers are latched in a locked position to guide the 80 mm disc and are unlatched when a 120 mm disc is inserted into the player. In order to prevent backlash in the interengaged teeth, an auxiliary locking member is provided to lock the stoppers when the 80 mm disc is inserted and to unlock the stoppers when the 120 mm disc is inserted. A pivotal locking member is released when the 120 mm disc is inserted into the player and the auxiliary locking member is connected to the pivotal locking member by a projection engaged in a recess.

3 Claims, 6 Drawing Sheets ized to use both the 80 mm disc and the 120 mm disc in common.
LOADING SYSTEM FOR 80MM AND 120MM CD'S IN A VEHICLE PLAYER DECK HAVING AUXILIARY LOCKING FOR GUIDING THE 80MM DISC

BACKGROUND OF THE INVENTION

1. Field of the Invention

The present invention relates to a compact disc drive for motor vehicles and more particularly to a loading assistant system for precisely and stably guiding an 80 mm disc onto a turntable when the disc is loaded in a compact disc drive which is designed to be commonly used for both an 80 mm disc and a 120 mm disc.

2. Description of the Prior Art

Generally, there are two types of compact discs, i.e. compact discs having a size of 80 mm and 120 mm in diameter, each of which is played in an 80 mm compact disc drive and a 120 mm compact disc drive for motor vehicles, respectively. As the case may be, the compact disc drive is designed to use both the 80 mm disc and the 120 mm disc in common.

In a general construction of the conventional compact disc drive deck as shown in FIGS. 1–3, the deck includes a body case 1 which is defined by a rectangular frame 11, an upper plate member and a lower plate member, and the case is provided with a turntable 2 in its central portion and an insertion slot 12 at its front end as shown in FIG. 1. A transverse axle 4 is disposed within the body case 1, that is, inside of the insertion slot 12 which acts to draw the inserted disc in the body case 1. The transverse axle 4 is surrounded by rubber material and is axially tapered from opposing ends toward the middle portion so as to progressively move the inserted disc in the central portion of the body case 1.

Further, stopper means 3 is provided in the innermost portion of the body case 1 for supporting the fully-inserted disc.

The stopper means 3 consists of a pair of stoppers 3A, 3B pivotally mounted on the inner portion of the body case 1 by pivot pins 31A, 31B, respectively. The left-sided and right-sided stoppers 3A, 3B include toothed portions 32A, 32B at their respective inner ends which engage with each other to permit simultaneous pivotal movement of the stoppers 3A, 3B, and also include downwardly-angled projections 33A, 33B at their respective leading ends. Particularly, a protrusion 34A projects upwardly from a central portion of the left-sided stopper 3A and a hook 35B is formed in the middle of the right-sided stopper 3B.

In detail, the stopper means 3 supports the inserted disc so that a center of the disc is guided onto the turntable 2 on condition that the stoppers 3A, 3B are not spread out in the case of the smaller 80 mm disc and that the stoppers 3A, 3B are spread out in case of the larger 120 mm disc.

For this purpose, on one side within the body case 1, a locking member 5 for the 80 mm disc is provided to prevent the stopper means 3 from being spread out whereas a pivot lever 8 for the 120 mm disc is provided to release the locking member 5 and so operate the stopper means 3.

The locking member 5 is mounted on the body case 1 by a pivot pin 51 and comprises a left-sided outer end portion 52 extending in a longitudinal direction, a left-sided inner end portion 54 having a latching jaw 53, and a right-sided hook 55 for a spring. The latching jaw 53 of the left-sided inner end portion 54 can releasably lock the protrusion 34A of the left-sided stopper 3A and the right-sided hook 55 is connected with the hook 35B of the right-sided stopper 3B by a spring 71 loaded therebetween as return means 7.

Also, the pivot lever 8 is pivotally mounted on the body case 1 by a central hinge pin 8' and a contact pin 82 at a leading end of the pivot lever 8 is pushed off by the inserted 120 mm disc. Consequently, a follower pin 83 at a rear end of the pivot lever 8 presses and actuates the left-sided outer end portion 52 of the locking member 5.

If the disc to be inserted is the 120 mm disc, for example, an outer peripheral surface of the disc pushes the contact pin 82 of the pivot lever 8 outwardly to actuate the stopper means 3 and then the follower pin 83 at the opposite end presses the outer end portion 52 of the locking member 5 inwardly as seen from FIG. 1.

Pivotal movement of the outer end portion 52 due to such inward pressing causes the inner end portion 54 to pivot outwardly and thus causes the latching jaw 53 of the inner end portion 54 to be released from the protrusion 34A of the left-sided stopper 3A.

As a result, both the stoppers 3A, 3B of the stopper means 3 can be swiveled backwardly at the same time by the interlocking toothed portions 32A, 32B so as to guide the 120 mm disc in an innermost position and chuck the center of the disc onto turntable 2 without preventing the inward movement of the disc. On the other hand, if the disc is drawn out, the stoppers 3A, 3B are restored by force of the return means, i.e. the spring 71 connected between the locking member 5 and the right-sided stopper 3B.

On the contrary, the 80 mm disc enters the body case 1 without being contacted by the contact pin 82 because of its small diameter. Entrance movement of the disc is stopped by contact with the downward projections 33A, 33B of the two stoppers 3A, 3B whose pivotal movement is prevented by locking action of the locking member 5, and the center of the disc is finally chucked onto the turntable 2 in such a position as shown by a chain line with two dots in FIG. 2.

With the above-mentioned loading system, there is no particular problem in inserting and loading the 120 mm disc D1 because the disc simultaneously comes into contact with both the downward projections 33A, 33B of the stoppers 3A, 3B from the moment of insertion owing to its large diameter and the stoppers 3A, 3B are also spread out simultaneously, whereby the center of the disc D1 is easily and precisely seated on the turntable 2.

However, when the 80 mm disc D2 is inserted, it primarily comes into contact with any one of the stoppers due to its small diameter. Particularly when the disc D2 comes into contact with the downward projection 33B of the right-sided stopper 3B, it is loaded on the turntable 2 not in a position that the stoppers 3A, 3B are spread out simultaneously but in a position that the right-sided stopper 3B is more spread out than the left-sided stopper 3A due to backlash of the toothed portions 32A, 32B. As a result, the smaller 80 mm disc D2 is not centered on the turntable 2, which causes poor chucking of the 80 mm disc.

SUMMARY OF THE INVENTION

This problem arises because the two stoppers which are designed to be spread out concurrently by the interlocking toothed portions are not spread out simultaneously due to the backlash. Accordingly, an object of the present invention is to solve the above-described problem and provide a compact disc player deck for motor vehicles which ensures precise chucking of a disc on a turntable by simultaneously spreading out the two stoppers of the disc stopper means when an 80 mm disc is inserted into the deck.

To achieve this object, there is provided a loading assistant system of a compact disc player deck for motor vehicles which comprises a body case defined by a rectangular frame, an upper plate member and a lower plate member, and provided with a turntable in a central portion thereof and an insertion slot at a front end thereof; a transverse axle disposed laterally inside the insertion slot of the body case, surrounded by rubber material and axially tapered from both ends toward the middle portion, the transverse axle rotating by means of transmitted power; a pivot lever disposed longitudinally within the body case for loading a 120 mm disc, the pivot lever including a central hinge axis for pivotal movement thereof, a contact pin at a leading end thereof and a follower pin at a rear end thereof; a locking member mounted on the body case by a pivot pin so as to pivot in response to action of the follower pin of the pivot lever for the 120 mm disc, the locking member including a left-sided outer end portion extending in a longitudinal direction, a left-sided inner end portion having a latching jaw, a right-sided hook for a spring, and a driving piece extending in a right-hand direction; an auxiliary locking member mounted on the body case by a pivot pin so as to pivot in response to action of the driving piece, the auxiliary locking member having a left-sided reentrant recess in engagement with the driving piece and a hook on the right side of the reentrant recess; and disc stopper means including a pair of left-sided and right-sided stoppers pivotally mounted inside the body case by pivot pins, each of the stoppers having an interlocking toothed portion at respective inner ends for permitting simultaneous pivotal movement of the stoppers and a downward projection at respective leading ends, the left-sided stopper being releasably locked by engagement of a protrusion projecting upwardly from a central portion thereof with the latching jaw of the locking member, the right-sided stopper being releasably locked by means of the hook of the auxiliary locking member, whereby an 80 mm disc is guided in position when inserted into said insertion slot without any fine movement of the stoppers of the stopper means.

A more complete appreciation of the present invention and many advantages thereof will be readily obtained upon reading the following detailed description.

BRIEF DESCRIPTION OF THE DRAWINGS

Preferred embodiments of the present invention will be described in detail with reference to the accompanying drawings, and wherein.

DESCRIPTION OF THE PREFERRED EMBODIMENTS

Figure 1:
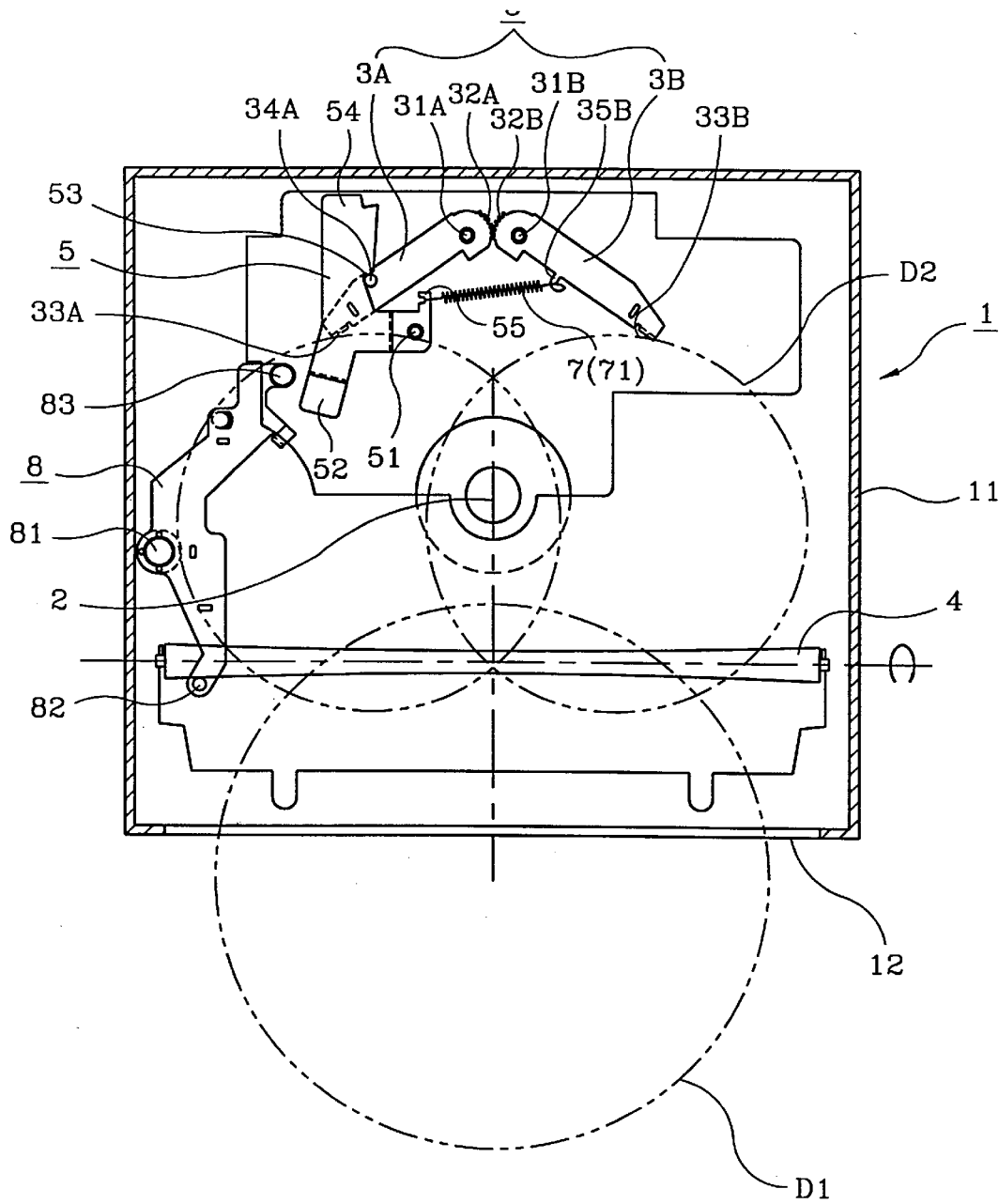
FIG. 1 is a top plan view showing the construction of the prior art.
Figure 2:
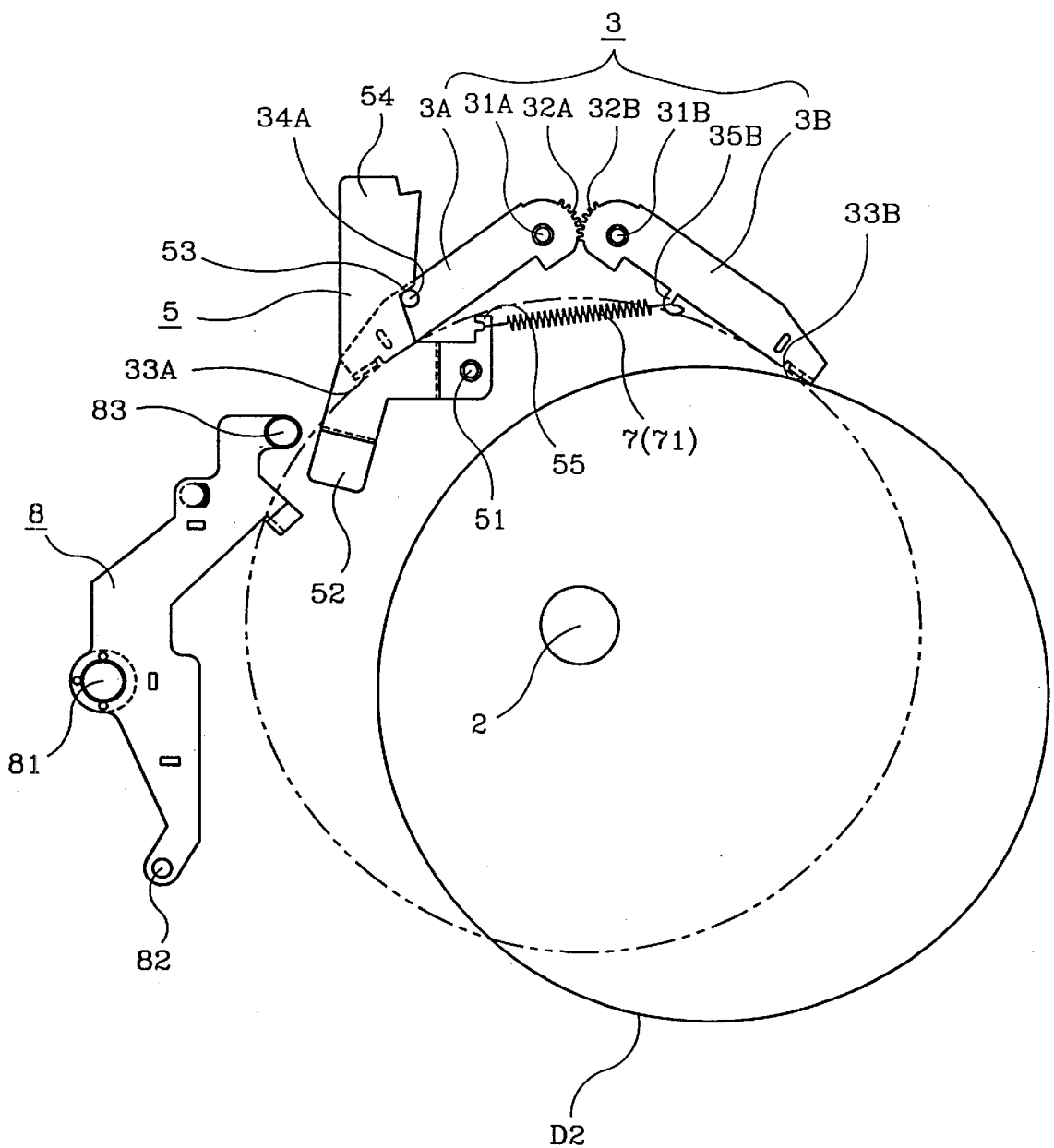
FIG. 2 is a top plan view showing the operating situation of the prior art in detail.
Figure 3:
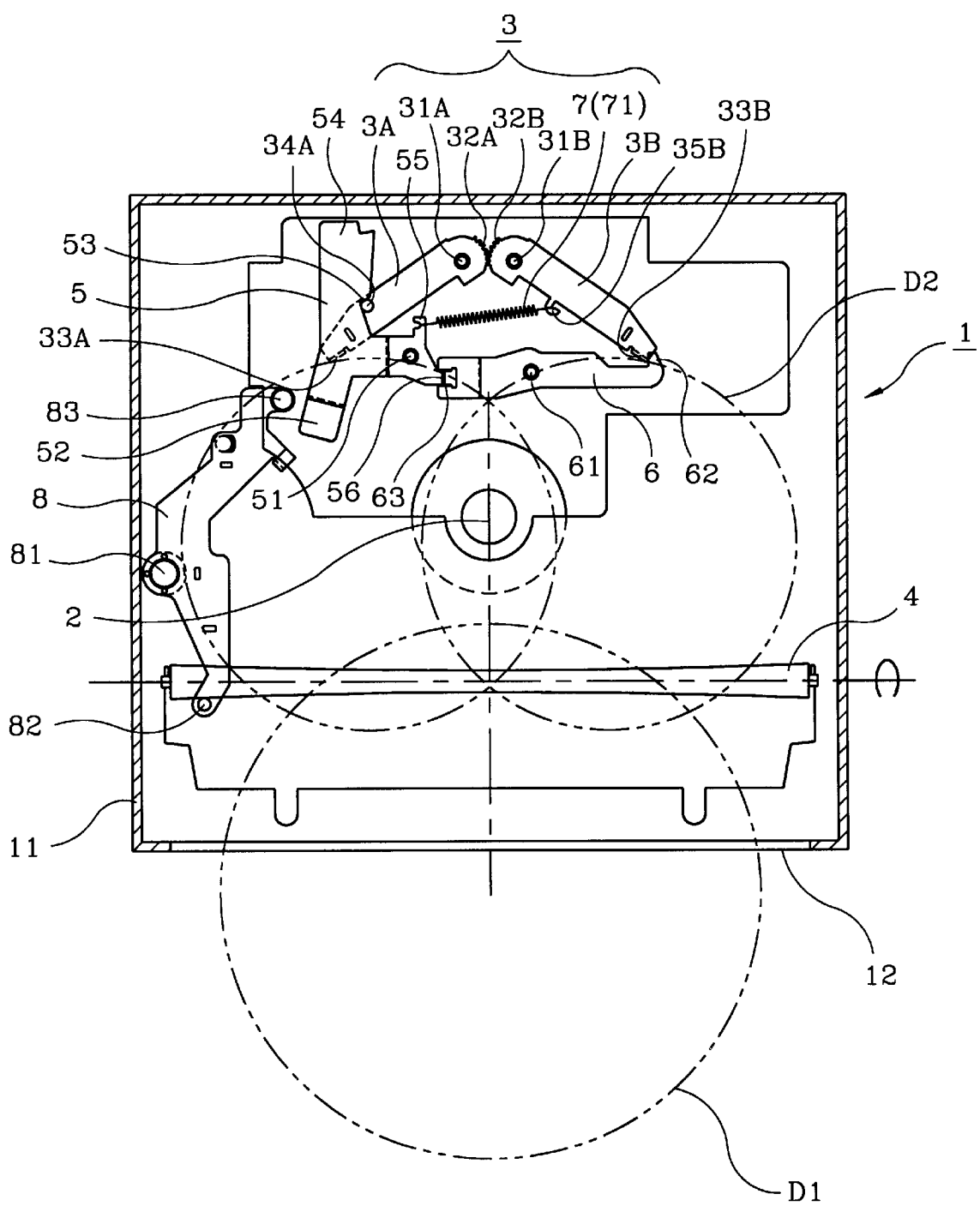
FIG. 3 is a top plan view showing the construction according to the present invention.
Figure 4:
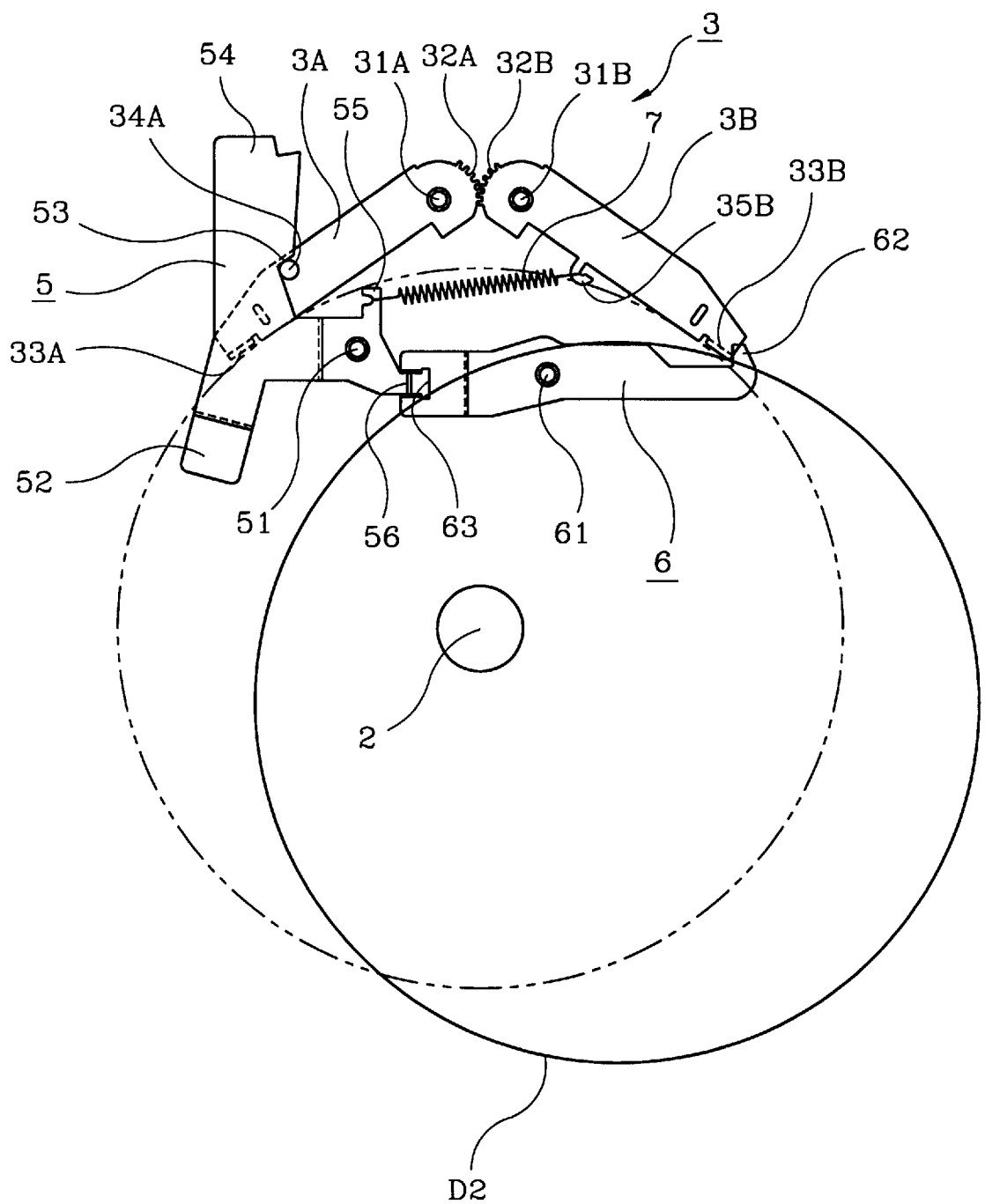
FIG. 4 is a top plan view showing the pre-operating situation of the present invention in detail.

FIG. 3 illustrates a deck of the construction according to the present invention in a plan view. Referring to FIG. 3, the deck comprises a body case 1, a transverse axle 4, a pivot lever 8, a locking member 5, an auxiliary locking member 6, disc stopper means 3 and return means 7 within the body case 1.

The body case 1 is defined by a rectangular frame 11, an upper plate member and a lower plate member. The body case 1 is also provided with a turntable 2 in its central portion and an insertion slot 12 at its front end.

The transverse axle 4 is disposed laterally inside the insertion slot 12 of the body case 1 so as to rotate by means of power transmitted from a separate power-transmission mechanism. The transverse axle 4 is surrounded by rubber material and is axially tapered from two opposing ends toward the middle portion.

The pivot lever 8 is disposed longitudinally within the body case 1 and is used only for loading a 120 mm disc. The pivot lever 8 is pivotally mounted on the body case 1 at a central hinge axis 81 and includes a contact pin 82 at its leading end and a follower pin 83 at its rear end.

The locking member 5 is mounted on the body case 1 by a pivot pin 51 so as to pivot in response to action of the follower pin 83 of the pivot lever 8 and includes a left-sided outer end portion 52 in the "äa"-shaped form extending in a longitudinal direction, a left-sided inner end portion 54 having a latching jaw 53, a right-sided hook 55 for a spring and a driving piece 56 extending in a right-hand direction.

Figure 7:
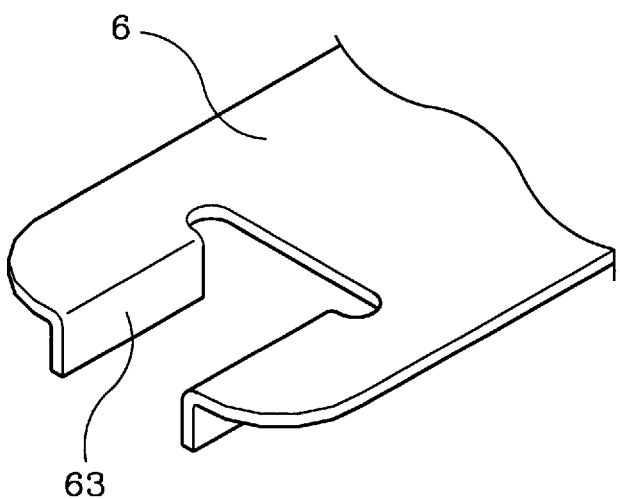
FIG. 7 is an enlarged perspective view of a restrained recess of an auxiliary locking member according to the present invention.

The auxiliary locking member 6 is mounted on the body case 1 by a pivot pin 61 so as to pivot in response to action of the driving piece 56 of the locking member 5 and has a left-sided reentrant recess 63 in engagement with the driving piece 56 and a hook 62 on the right side of the auxiliary locking member 6. As shown in FIG. 7, an internal surface of the reentrant recess 63 is bent and extends downwardly so that abrasion and friction of the material can be reduced.

The disc stopper means 3 comprises a pair of left-sided and right-sided stoppers 3A, 3B which are pivotally mounted inside the body case 1 by pivot pins 31A, 31B, respectively. The pair of stoppers 3A, 3B can pivot simultaneously by means of toothed portions 32A, 32B which are interlocked with each other at their respective inner ends. Further, the stoppers 3A, 3B have downward projections at their respective leading end.

Of the stopper 3A, 3B, the left-sided stoppers 3A is releasably locked by engagement of a protrusion 34A projecting upwardly from a central portion of the stopper 3A with the latching jaw 53 of the locking member 5 whereas the right-sided stopper 3B is releasably locked by means of the hook 62 of the auxiliary locking member 6.

The return means 7 is constituted by connecting a spring 71 between the hook 55 of the locking member 5 and the hook 35B of the right-sided stopper 3B, which means 7 normally maintains an angle of the stoppers 3A, 3B with respect to each other to be suitable for a 80 mm disc, i.e. not to be expanded.

The present invention is almost the same as the prior art as regards the transverse shaft 4, the pivot lever 8 and the stopper means 3, but there are differences in that the present invention provides an improvement in the shape of the locking member 5 and further includes the auxiliary locking member 6.

Now, it will be described how the present invention of the above-mentioned construction is operated.

For example, when the 120 mm disc is inserted into the insertion slot 12 of the body case 1, the disc moves toward the central portion of the body case 1 with the aid and guidance of the transverse axle 4 and then actuates the pivot lever 8.

Namely, an outer peripheral surface of the disc pushes the contact pin 82 of the pivot lever 8 outwardly to actuate the stopper means 3. Then, the follower pin 83 on the opposing side of lever 8 presses the outer end portion 52 of the locking member 5 inwardly.

Figure 5:
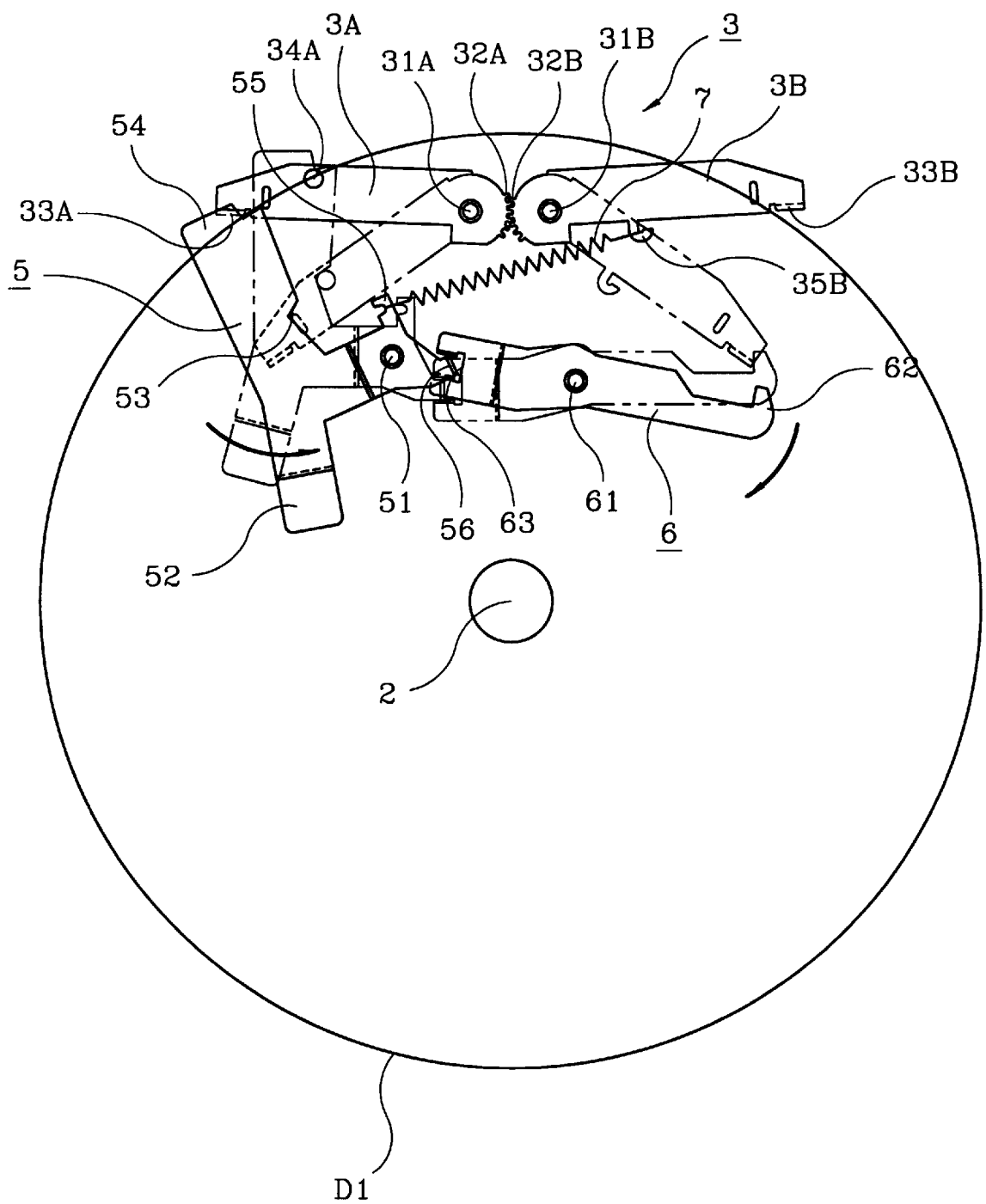
FIG. 5 is a top plan view showing the post-operating situation of the present invention in detail.

As in seen in FIG. 5, the inward pivotal movement of the outer end portion 52 causes the inner end portion 54 to pivot outwardly and thus causes the latching jaw 53 of the inner end portion 54 to be unlocked from the protrusion 34A of the left-sided stopper 3A.

At the same time, pivotal movement of the driving piece 56 of the locking member 5 is produced, which in turn provides pivotal movement of the auxiliary locking member 6 on the right side of the driving piece 56.

That is, since the driving piece 56 is in engagement with the reentrant recess 63, the auxiliary locking member 6 pivots in accordance with the pivotal movement of the driving piece 56. The pivotal movement of the auxiliary locking member 6 results in release of the opposing hook 62 from the downward projection 33B of the right-sided stopper 3B.

In this way, unlocking of the latching jaw 53 of the locking member 5 from the protrusion 34A renders the left-sided stopper 3A to be rotated or spread out while release of the hook 62 of the auxiliary locking member 6 renders the right-sided stopper 3A to be rotated. Such rotation of the stoppers 3A, 3B enables the 120 mm disc D1 to be further inserted and to be centered on the turntable 2.

Figure 6:
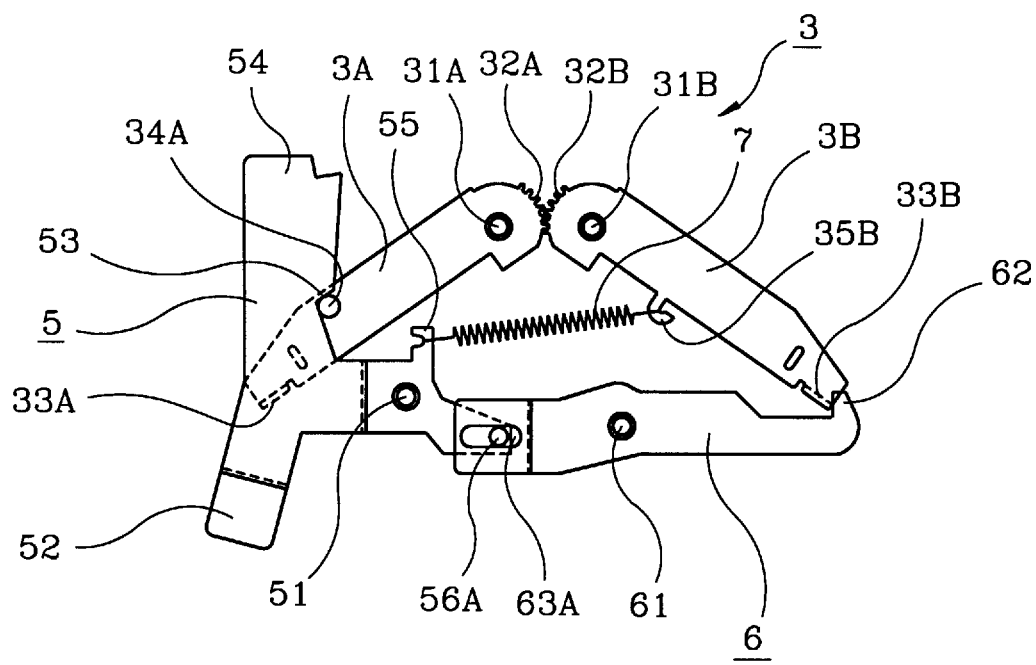
FIG. 6 is a top plan view of another embodiment of the present invention in detail.

The driving piece 56 of the locking member 5 and the reentrant recess 63 of the auxiliary locking member 6 could be of another construction as shown in FIG. 6.

In this embodiment, a projection 56A projects from a leading end of the driving piece 56 and the reentrant recess 63 is formed as an elongated hole 63A in which the projection 56A is inserted.

This embodiment can effectively prevent separation of the leading ends of the driving piece 56 and the auxiliary locking member 6 from each other because the projection 56A moves only in the elongated hole 63A.

When the 120 mm disc D1 is removed from the deck, all of the stopper means 3, the locking member 5 and the auxiliary locking member 6 are restored to their initial positions by means of the spring 71 of the return means 7 which is connected between the locking member 5 and the right-sided stopper 3B.

On the other hand, when an 80 mm disc D2 is inserted, the disc is guided and chucked directly in position by the stopper means 3 without being contacted by the pivot lever 8 due to its small diameter.

More particularly, even if the disc D2 being inserted comes into contact with either one of the stoppers 3A, 3B of the stopper means, i.e. either one of the downward projections 33A, 33B, the disc D2 is precisely guided onto the turntable 2 without any fine movement of the stoppers 3A, 3B due to the backlash because both the stoppers 3A, 3B are locked by means of the locking member 5 and the auxiliary locking member 6, which is clearly in contrast with the conventional construction.

As previously described in detail, the present invention provides a compact disc drive deck commonly used for an 80 mm disc and a 120 mm disc which is free from poor chucking of the 80 mm disc D2 by simultaneously locking the stoppers 3A, 3B of the disc stopper means 3 using the locking member 5 and the auxiliary locking member 6. Since the stoppers 3A, 3B are locked simultaneously, the disc D2 is guided in position without independent movement of either one stopper 3A or 3B even if the disc D2 is not inserted in the exactly-centered position.

The invention has been described with reference to the preferred embodiments but is for illustrative purposes only and the invention is not limited thereto. It will be easily understood by those skilled in the art that variations and modifications can readily be made to the disclosed embodiments. It is intended to include all such variations and modifications insofar as they come within the scope of the appended claims or the equivalents thereof.

What is claimed is:

1. A loading assistant system of a compact disc player deck for motor vehicles comprising:

a body case defined by a rectangular frame, an upper plate member and a lower plate member, said body case being provided with a turntable in a central portion thereof and an insertion slot at a front end thereof;

a transverse axle disposed laterally inside of said insertion slot of said body case, surrounded by rubber material and axially tapered from both ends toward a middle portion, said transverse axle rotating by means of transmitted power;

a pivot lever disposed longitudinally within said body case for loading a 120 mm disc, said pivot lever including a central hinge axis for pivotal movement thereof, a contact pin at a leading end thereof and a follower pin at a rear end thereof;

a locking member mounted on said body case by a pivot pin so as to pivot in response to action of said follower pin of said pivot lever when the 120 mm disc is inserted into said body case, said locking member including a left-sided outer end portion extending in a longitudinal direction, a left-sided inner end portion having a latching jaw, a right-sided hook for a spring, and a driving piece extending in a right-hand direction;

an auxiliary locking member mounted on said body case by a pivot pin so as to pivot in response to action of said driving piece, said auxiliary locking member having a reentrant recess at a left side of said auxiliary locking member in engagement with said driving piece and a hook at a right side of said auxiliary locking member; and disc stopper means including a pair of left-sided and right-sided stoppers pivotally mounted inside of said body case by pivot pins, each of said stoppers having an interlocking toothed portion at a respective inner end for permitting simultaneous pivotal movement of said stoppers and a downward projection at respective leading ends, said left-sided stopper being releasably locked by engagement of a protrusion projecting upwardly from a central portion thereof with said latching jaw of said locking member, said right-sided stopper being releasably locked by means of the hook of the auxiliary locking member, thereby allowing an 80 mm disc to be guided in position onto said turntable while said stoppers remain locked by said locking member and said auxiliary locking member without any fine movement of said stoppers of said stopper means, said latching jaw of said locking member being disengaged from said protrusion on said left-sided stopper when the 120 mm disc is inserted into said body case while said hook on said auxiliary locking member is disengaged from said right-sided stopper to allow said stoppers to pivot and guide the 120 mm disc onto said turntable.

2. The loading assistant system according to claim 1 wherein an internal surface of said reentrant recess is bent and extends downwardly so as to reduce friction of the material.

3. The loading assistant system according to claim 1 wherein a projection projects from an leading end of said driving piece and said reentrant recess is formed as a elongated hole in which said projection is inserted.

\* \* \* \* \*